United States Patent [19]
Demozay

[11] 3,829,568
[45] Aug. 13, 1974

[54] INSECTICIDE COMPOSITION DERIVED FROM PHOSPHORIC ESTERS CONTAINING ONE UNSATURATED ALIPHATIC CHAIN

[75] Inventor: Daniel Demozay, Villeurbanne, France

[73] Assignee: PEPRO, Societe pour le Developpement et la Vente de Specialites Chimiques, Lyon, France

[22] Filed: Mar. 19, 1970

[21] Appl. No.: 21,200

[30] Foreign Application Priority Data
Mar. 21, 1969 France .................................. 69.7608
Feb. 27, 1970 France .................................. 70.2061

[52] U.S. Cl. ................ 424/203, 424/217, 424/219, 424/DIG. 8
[51] Int. Cl. .............................................. A01n 9/36
[58] Field of Search ....... 424/203, 217, 219, DIG. 8

[56] References Cited
UNITED STATES PATENTS
2,865,801  12/1958  Baker et al. ........................ 424/219
FOREIGN PATENTS OR APPLICATIONS
1,012,112  7/1957  Germany ........................... 424/203
1,263,748  3/1966  Germany ........................... 424/219

OTHER PUBLICATIONS

C. R. Acad. Sc. Paris, Vol. 265 (D), pp. 291–94, 1967.

*Primary Examiner*—Albert T. Meyers
*Assistant Examiner*—Frederick E. Waddell
*Attorney, Agent, or Firm*—Browdy and Neimark

[57] ABSTRACT

Insecticide compositions wherein the active materials are phosphorus derivatives of the general formula

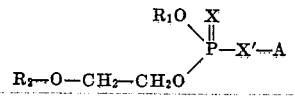

wherein $R_1$ and $R_2$ are lower alkyl radicals preferably of 1–3 carbon atoms, X and X' are sulfur or oxygen, $R_2OCH_2$ - may also be a tetrahydrofurfuryl cycle, A is an alkenyl or alkynyl radical containing from two to five carbon atoms, which may be substituted by one or more identical or different halogen atoms.

10 Claims, No Drawings

INSECTICIDE COMPOSITION DERIVED FROM PHOSPHORIC ESTERS CONTAINING ONE UNSATURATED ALIPHATIC CHAIN

The present invention relates to insecticide compositions wherein the active materials are phosphorus derivatives of the general formula

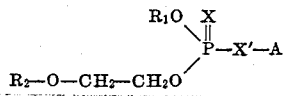

wherein $R_1$ and $R_2$ are lower alkyl radicals preferably of one to three carbon atoms, X and X' are sulfur or oxygen, $R_2OCH_2-$ may also be a tetrahydrofurfuryl cycle, A is an alkenyl or alkynyl radical containing from two to five carbon atoms, which may be substituted by one or more identical or different halogen atoms. Thus A may represent the following radicals:

- allyl —$CH_2$—$CH=CH_2$
- chloro-2-propene —$CH_2$—$CCl=CH_2$
- dichloro-2,3-propene —$CH_2$—$CCl=CHCl$
- trichloro-2,3,3-propene —$CH_2$—$CCl=CCl_2$
- butene —$CH_2$—$CH=CH$—$CH_3$
- isobutene —$CH_2$—$C=CH_2$
  $\qquad\qquad\quad\;|$
  $\qquad\qquad\;CH_3$
- propargyl —$CH_2$—$C\equiv CH$ These compounds are prepared by allowing a suitable alkenyl or alkynyl halide to react with the tetramethylammonium salt of phosphoric acid according to the equation

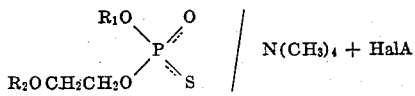

A specific method for carrying out this reaction is described in the French Patent Application No. PV 69-05175, which states that a thiono-phosphoric ester is caused to react with trimethylamine in an organic anhydrous diluent such as acetone or acetonitrile to obtain the tetramethylammonium salt shown above, and that this salt is then reacted in accordance with the above equation with the halogenated derivative of A (Hal being preferably bromine).

In its first working example, there is disclosed the method of manufacturing product No. 8 below, namely O-methyl O-($\beta$-methoxyethyl)S propargyl phosphate as follows:

For 8 hours at ambient temperature a mixture of 25.9 parts of tetramethylammonium O-methyl O-($\beta$-methoxyethyl) thiophosphate 13 parts of propargyl bromide and 50 parts of acetonitrile are mixed. The solvent is expelled under vacuum and the residue is dissolved in 100 parts of chloroform. The chloroformic solution is washed with an aqueous solution of sodium bicarbonate just to alkalinity then with water to neutrality, followed by drying over sodium sulfate. The chloroform is expelled and the produce is purified by distillation, there being obtained 18.4 parts of a yellowish liquid boiling at 128° – 129°C. under 0.05 mm. Hg.

EXAMPLE 1

According to the said procedure, numerous compounds have been synthetised, among which:

| | Boiling point, °/mm. Hg | $n_D^{20}$ |
|---|---|---|
| Product No. 1: $\quad CH_3O\quad O$ $\qquad\qquad\quad\;\;\backslash\;\;\parallel$ $\qquad\qquad\qquad P-S-CH_2-CH=CH_2$ $\qquad\qquad\;\;/$ $\quad CH_3O(CH_2)_2O$ | 115°/0.05 | 1.4775 |
| Product No. 2: $\quad CH_3O\quad O$ $\qquad\qquad\;\;\backslash\;\;\parallel$ $\qquad\qquad\;\;P-S-CH_2-CCl=CH_2$ $\qquad\qquad\;\;/$ $\quad CH_3O(CH_2)_2O$ | 102°/0.05 | 1.490 |
| Product No. 3: $\quad CH_3O\quad O$ $\qquad\qquad\;\;\backslash\;\;\parallel$ $\qquad\qquad\;\;P-S-CH_2-CCl=CHCl$ $\qquad\qquad\;\;/$ $\quad CH_3O(CH_2)_2O$ | 99°/0.01 | 1.510 |
| Product No. 4: $\quad CH_3O\quad O$ $\qquad\qquad\;\;\backslash\;\;\parallel$ $\qquad\qquad\;\;P-S-CH_2-CCl=CCl_2$ $\qquad\qquad\;\;/$ $\quad CH_3O(CH_2)_2O$ | 90°/0.01 | 1.487 |
| Product No. 5: $\quad CH_3O\quad O$ $\qquad\qquad\;\;\backslash\;\;\parallel$ $\qquad\qquad\;\;P-S-CH_2-CH=CHCH_3$ $\qquad\qquad\;\;/$ $\quad CH_3O(CH_2)_2O$ | 97°/0.05 | 1.4825 |
| Product No. 6: $\quad CH_3O\quad O$ $\qquad\qquad\;\;\backslash\;\;\parallel$ $\qquad\qquad\;\;P-S-CH_2-C\equiv CH$ $\qquad\qquad\;\;/$ $\quad C_2H_5O(CH_2)_2O$ | 108°/0.05 | 1.4865 |
| Product No. 7: (tetrahydrofurfuryl) $\quad CH_3O\quad O$ $\qquad\qquad\;\backslash\;\;\parallel$ $\qquad\qquad\;P-S-CH_2-C\equiv CH$ $\qquad\qquad\;/$ | 111°/0.05 | 1.502 |
| Product No. 8: $\quad CH_3O\quad O$ $\qquad\qquad\;\;\backslash\;\;\parallel$ $\qquad\qquad\;\;P-S-CH_2-C\equiv CH$ $\qquad\qquad\;\;/$ $\quad CH_3O(CH_2)_2O$ | 128°/0.05 | 1.4888 |
| Product No. 9: (tetrahydrofurfuryl) $\quad CH_3O\quad O$ $\qquad\qquad\;\backslash\;\;\parallel$ $\qquad\qquad\;P-S-CH_2-CCl=CHCl$ $\qquad\qquad\;/$ | 125°/0.01 | 1.517 |
| Product No. 10: (tetrahydrofurfuryl) $\quad CH_3O\quad O$ $\qquad\qquad\;\backslash\;\;\parallel$ $\qquad\qquad\;P-S-CH_2-C=CH_2$ $\qquad\qquad\;/\qquad\qquad\quad\;\;\|$ $\qquad\qquad\qquad\qquad\qquad\;\;CH_3$ | 115°/$10^{-2}$ | 1.495 |
| Product No. 11: (tetrahydrofurfuryl) $\quad C_2H_5O\quad O$ $\qquad\qquad\;\;\backslash\;\;\parallel$ $\qquad\qquad\;\;P-S-CH_2-C\equiv CH$ $\qquad\qquad\;\;/$ | 95°/$10^{-3}$ | 1.495 |
| Product No. 12: $\quad C_2H_5O\quad O$ $\qquad\qquad\;\;\backslash\;\;\parallel$ $\qquad\qquad\;\;P-S-CH_2-C\equiv CH$ $\qquad\qquad\;\;/$ $\quad CH_3OCH_2CH_2O$ | 85°/$10^{-3}$ | 1.481 |

Our work has just shown that the said compounds have insecticide and acaricide properties which are outstanding, and enable them to be used successfully in fighting against the parasitic arthropoda encountered, in particular, in agriculture and horticulture.

In order to bring out the superiority of such compounds over previously known related derivatives, and/or over the products used in the trade for the same purpose, the compounds according to the invention have been compared with the following products:

AZINPHOS-ETHYL, a common name for 5(3,4 dihydro-4-oxobenzo(d)-(1,2,3)-triazine-3-yl-methyl O,O-diethylphosphate.

BROMOPHOS, a common name for O-(4-bromo 2,5-dichlorophenyl) O,O-dimethyl-phosphorothionate.

CARBARYL, a common name for 1-Naphtyl N-methyl-carbamate.

DICHLORVOS, a common name for 2-2 dichlorovinyl dimethylphosphate.

D.D.T., a common name for dichlorodiphenyltrichloroethane.

DICOFOL, a common name for 2,2,2-trichloro-1,1-di(4-chlorophenyl) ethanol.

DIMETHOATE, a common name for S-(N-methyl-carbamoylmethyl) O,O-dimethyl-phosphorodithioate.

LINDANE, a common name for the $\gamma$ isomer of 1,2,3,4,5,6-hexachlorocyclohexane.

MALATHION, a common name for S-(1,2-di(ethoxycarbonyl)ethyl) O,O-dimethyl-phosphorodithioate.

PARATHION, a common name for O(p-nitrophenyl) diethylphosphorothionate.

FENITROTHION, a common name for O(3-methyl-4-nitrophenyl) dimethylphosphorothionate.

FENCHLORPHOS, a common name for 2,4,5-trichlorophenyl dimethyl-phosphorothionate.

as well as with the two compounds having related structures, as claimed in the Canadian Patent No. 791,756, dated Mar. 21, 1957, which will be called products A and B, respectively, in this description:

| | Boiling point, °/ mm. Hg | $n_D^{20}$ |
|---|---|---|
| Product "A": $CH_3O(CH_2)_2O$ \\ $P-S-CH_2-C\equiv CH$ // $CH_3O(CH_2)_2O$ | 120/0.05 | 1.4840 |
| Product "B": $CH_3O$ \\ $P-S-CH_2-C-CH$ // $CH_3O$ | 95/0.05 | 1.493 |

Example 2: Test on the wheat weevil (*Calandra granaria*) 5cc of an acetone solution of the active material to be tested are deposited on a glass plate by spraying.

After evaporating the acetone, 100 adult weevils (*Calandra granaria*) are disposed on the said glass plate and are kept there for 2 hours.

The weevils are then disposed in Petri boxes for 10 days, during which period normal food is offered to them. During the said period, periodical checks are effected, in order to determine the number of dead weevils.

Under such conditions, the $DL_{50}$ (concentration level resulting in 50 percent mortality for the weevils) of product No. 8 ranges from 0.01 to 0.05 g/l., while that of products Nos. 2, 3, 4 is 0.05 g/l.

Under the same conditions, the $DL_{50}$ of D.D.T. and Azinphos ranges only from 0.1 to 0.5 g/l., and that of products A and B is 1 g/l.

Example 3 - Test on sensitive flies (*Musca domestica*) 10 adult flies, 4 or 5 days old, are disposed in a Petri box having a netting lid.

The Petri box is treated directly by spraying 5 cc of an acetone solution of the active material at the concentration required. The number of flies showing symptoms of intoxication (knock down) is noted 5, 10, 15, 20, 25, 30, 60 and 120 minutes after the treatment.

Under such conditions, products 5, 6 and 8 bring about a 100 percent mortality for the flies in 30 minutes, as soon as the concentration is 0.05 g/l., while with the same dose the industrial products used, such as Parathion and Dichlorvos, achieve only 20 percent and 50 percent mortalities, respectively, and require 2 hours for complete mortality. Under the same conditions, but at a concentration 5 times stronger, Fenitrothion and Dimethoate only result in a 20 percent mortality within 30 minutes. Fenchlorphos and Bromophos only result in a 20 percent mortality at a concentration of 0.5 g/l., and Malathion, an insecticide commonly used for fighting against flies, produces a 40 percent mortality in 30 minutes, at a concentration of 1 g/l., and requires 2 hours for obtaining a 100 percent mortality.

Product A, when compared, should be used at a concentration of 2 g/l. for obtaining in 30 minutes an equivalent mortality.

Example 4 - Test on cockroaches (*Blatella germanica*)

5 adult cockroaches are disposed in a Petri box having a netting lid.

The Petri box is treated directly by spraying 5 cc of an acetone solution of the active material tested, at the concentration required. The mortality obtained 48 hours after the treatment is noted (any insect unable to move normally is counted as dead).

Under such conditions, products Nos. 7 and 8 cause a complete mortality as soon as the concentration is 0.05 g/l., and products Nos. 2, 3, 6 and 9 cause the same mortality as soon as the concentration is 0.1 g/l., while product B, when compared, results only in a 50 percent mortality for coackroaches.

By way of comparison, it may be indicated that, in order to obtain an equivalent mortality, Fenchlorphos and Carbaryl have to be used at a concentration of 0.5 g/l., and Azinphos, D.D.T., Malathion and Dimethoate have to be used at a concentration of 1 g/l.

Example 5 - Test on flour mites (*Ephestia kuhniella*)

The procedure consists in depositing the active material, after dissolving same in acetone, onto an azyme cachet, and disposing then a few eggs of *Ephestia kuhniella* on the said cachet in order to watch the hatching thereof.

A few drops of an acetone solution of the active material having the required concentration are poured onto an azyme cachet. The acetone is then allowed to evaporate. 10 eggs of *Ephestia kuhniella* are then placed in the cachet, and covered with a glass plate. The first hatchings occur with the controls from 4 to 5 days later. Checks are effected after 10 days, and the percentage of dead caterpillars with respect to the total number of eggs is determined.

In this test, product No. 8 causes a complete mortality at a concentration of 0.001 g/l., while product No. 9 achieves the same result at a concentration of 0.005 g/l. Under the same conditions, products A and B cause a mortality of 50 percent, with a concentration ten times higher. It is necessary to use Lindane, Dimethoate, and Carbaryl at a concentration of 0.05 g/l. in order to obtain the same result.

Example 6 - Test on Acaridae (*Tetranychus urticae*)

Small discs of a diameter of about 2 cm are cut out of a beam leaf highly infected with *Tetranychus urticae* at various stages of development, and are sprayed with an acetone solution of the active material at the concentration required. The said discs are then kept in a hothouse by means of a simple assembly preventing them from drying up.

Two days after the beginning of the test, the death rate obtained is noted by means of a binocular magnifying lens.

Under such conditions, products 5, 6, 7, 8, and 9 cause a mortality of 100 percent at a concentration of 0.005 g/l. In the same test, it is necessary to use the products A and B at a concentration of 0.1 g/l. in order to obtain an equivalent mortality.

Under the same conditions, Dicofol, which is an acaricide very much used, only achieves a 50 percent mortality at a concentration of 0.01 g/l., and a phosphoric ester such as Malathion only causes a 50 percent mortality at a concentration of 0.05 g/l.

Example 7 - Test on Acaridae (*Tetranychus urticae*) in hothouse.

Bean plants infected with *Tetranychus urticae* are treated directly by means of a small compressed air spray, and checks for mortality are effected, and carried on for about a fortnight.

Under such conditions, products 5, 6, 7, 8, 9 cause a 100 percent mortality for the Acaridae at a concentration of 1 g of active material per hectolitre. In order to obtain the same result with Dicofol or Parathion, doses 4 or 5 times as high must be used.

The whole of the results indicated hereinabove illustrate outstandingly both the polyvalent action of the compounds according to the invention, and the substantial technical advance they represent with respect to the known products commonly used.

As far as the polyvalent action is concerned, a study of the tests described hereinabove shows that the said compounds are adapted to act in two ways, that is, by contact as well as by ingestion. Besides, the polyvalence thereof is very wide, since they are active for a very large variety of parasitic, biting or sucking arthropoda, in particular insects and acaridae.

Furthermore, the tests effected have shown that the said compounds also have endotherapic and systemic properties, that is, they are carried along from the point where they are applied to the various parts of the plant being treated, this by a process the detail of which has not been studied, but the driving element of which is, in all probability, the sap.

This is particularly advantageous, since this phenomenon enables the crops treated to be protected at locations where, on account of mechanical or physical problems, it is very difficult, or even impossible, to bring the insecticide active material.

Furthermore, in the many tests carried out, the products according to the invention have never shown the least symptom of phtotoxicity towards the crop concerned, even in the case of very sensitive crops, such as young bean plants grown in hothouse.

Obviously, the examples mentioned hereinabove are only given as illustrations of the pesticidal activity of the compounds according to the invention, and do not restrict same to the parasites and/or crops cited therein.

The activity of the said compounds is exerted, in fact, in a general way, on a very large number of animal parasites, and the present invention relates to any use of them as pesticides, whatever kind of application is used, and in particular to fighting against the insects or acaridae, parasites of man or animals, of crops, of stored foodstuffs, of materials stocked or worked.

The compounds according to the invention should, for the practical use thereof, be formulated according to the conventional technics of the pesticide industry. Such formulations, which may be either ready for use or adapted to be diluted before use, are intended for enabling the active material to exert its action under the best conditions, and also for enabling the users to have products much easier to use than the active materials. Such formulations may be liquid or solid, and include generally various carriers or solvents, as well as adjuvants such as surface active agents, anti-foaming agents, anti-caking agents, anti-flocculating agents, adhesives, or the like. The formulations obtained in such a way are, for instance, powders to be sprinkled, granules, wettable powders, solutions, solutions adapted to be emulsified, direct or inverted solutions.

For some special uses, in particular in the horticultural or domestic field, the said products may also be in aerosol form.

All such formulation procedures are well known in the art, and, besides, a very abundant literature has been devoted to the subject, in particular in works such as "Chemistry of the Pesticides" 3rd edition, by D. H. Frear, pp. 409-433 (edited by Academic Press), or "The Scientific Principles of Crop Protection" by H. Martin, pp. 60–84 (edited by E. Arnold, London).

What is claimed is:

1. A method of killing a pest selected from the group consisting of insects and mites comprising applying to the habits of said pest an effective pesticidal amount of a composition
consisting essentially of an insecticidal-mitcidal carrier and an effective amount sufficient to kill insects and mites, of an active material having the following formula:

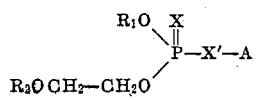

wherein $R_1$ and $R_2$ are each lower alkyl of 1-3 carbons; $X'$ and $X$ are oxygen or sulfur and $A$ is alkenyl containing from two to five carbons, which may be substituted by at least one chlorine; or $R_2OCH_2$ may form tetrahydrofurfuryl in which case $A$ is alkenyl or alkynyl containing form two to five carbons, which may be substituted by at least one chlorine.

2. A method in accordance with claim 1 wherein said active material is:

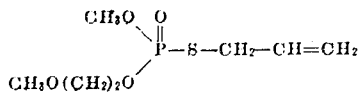

3. A method in accordance with claim 1 wherein said active material is:

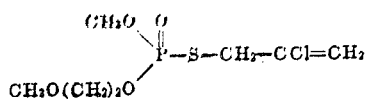

4. A method in accordance with claim 1 wherein said active material is:

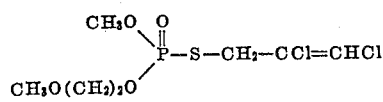

5. A method in accordance with claim 1 wherein said active material is:

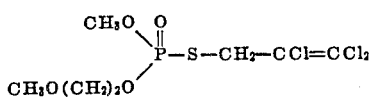

6. A method in accordance with claim 1 wherein said active material is:

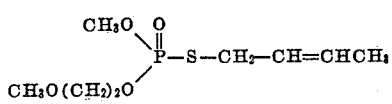

7. A method in accordance with claim 1 wherein said active material is:

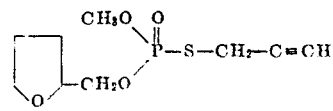

8. A method in accordance with claim 1 wherein said active material is:

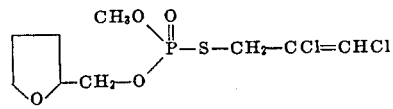

9. A method in accordance with claim 1 wherein said active material is:

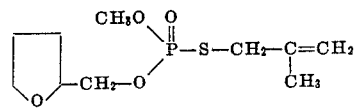

10. A method in accordance with claim 1 wherein said active material is:

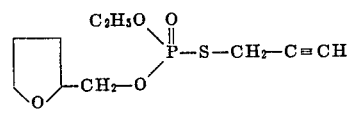

* * * * *